United States Patent
Carroll

(10) Patent No.: US 10,202,002 B2
(45) Date of Patent: Feb. 12, 2019

(54) SERVICEABLE REPLACEMENT SPINDLE

(71) Applicant: Axle Tech Inc., Claremore, OK (US)

(72) Inventor: Todd Carroll, Claremore, OK (US)

(73) Assignee: Axle Tech Inc., Claremore, OK (US)

( * ) Notice: Subject to any disclaimer, the term of this patent is extended or adjusted under 35 U.S.C. 154(b) by 112 days.

(21) Appl. No.: 15/486,611

(22) Filed: Apr. 13, 2017

(65) Prior Publication Data

US 2018/0297400 A1    Oct. 18, 2018

(51) Int. Cl.
*B60B 35/02* (2006.01)
*B60B 35/08* (2006.01)
*B23P 6/00* (2006.01)

(52) U.S. Cl.
CPC ............ *B60B 35/025* (2013.01); *B23P 6/00* (2013.01); *B60B 35/08* (2013.01); *B60B 2310/302* (2013.01); *B60B 2320/10* (2013.01); *B60B 2380/80* (2013.01); *B60B 2900/541* (2013.01)

(58) Field of Classification Search
CPC ....... B60B 35/025; B60B 35/04; B60B 35/08; B23P 6/00
See application file for complete search history.

(56) References Cited

U.S. PATENT DOCUMENTS

| | | | | |
|---|---|---|---|---|
| 844,893 | A * | 2/1907 | Raines et al. | 301/132 |
| 937,316 | A * | 10/1909 | Marler | 301/132 |
| 1,001,905 | A * | 8/1911 | Tuller | 301/132 |
| 1,008,875 | A * | 11/1911 | Tennison | 301/132 |
| 1,028,090 | A * | 5/1912 | Wilson | 301/132 |
| 3,715,935 | A * | 2/1973 | Ebey | F16H 57/023 301/131 |
| 4,363,522 | A * | 12/1982 | Palovcik | B60B 35/08 301/131 |
| 4,571,795 | A * | 2/1986 | Shiets | B22D 19/10 29/26 B |
| 4,592,596 | A * | 6/1986 | Trautloff | B60B 35/12 180/217 |
| 4,674,163 | A * | 6/1987 | Nugier | B23P 6/00 228/48 |
| 4,768,839 | A * | 9/1988 | Spindler | B23K 20/129 301/124.1 |
| 4,792,080 | A * | 12/1988 | Ferrari | B23K 37/0443 228/49.3 |
| 6,024,418 | A * | 2/2000 | Ebert | B23K 31/02 301/130 |
| 8,827,285 | B1 | 9/2014 | Su | |

* cited by examiner

*Primary Examiner* — Jason R Bellinger
(74) *Attorney, Agent, or Firm* — Head, Johnson, Kachigian & Wilkinson, PC

(57) ABSTRACT

A replacement spindle that can be easily removed for service or replacement. The spindle may have a threaded projection corresponding to a threaded bushing, which may be secured within an axle tube. The spindle may be screwed into place for use, then unscrewed for service or replacement.

13 Claims, 5 Drawing Sheets

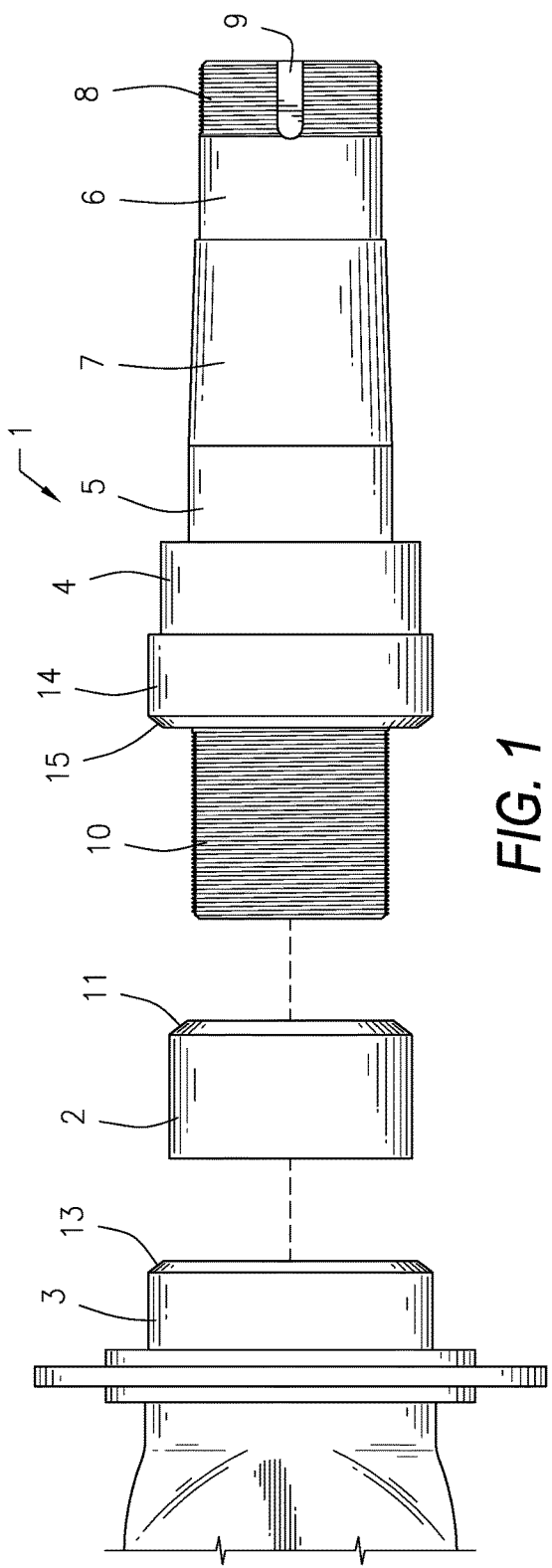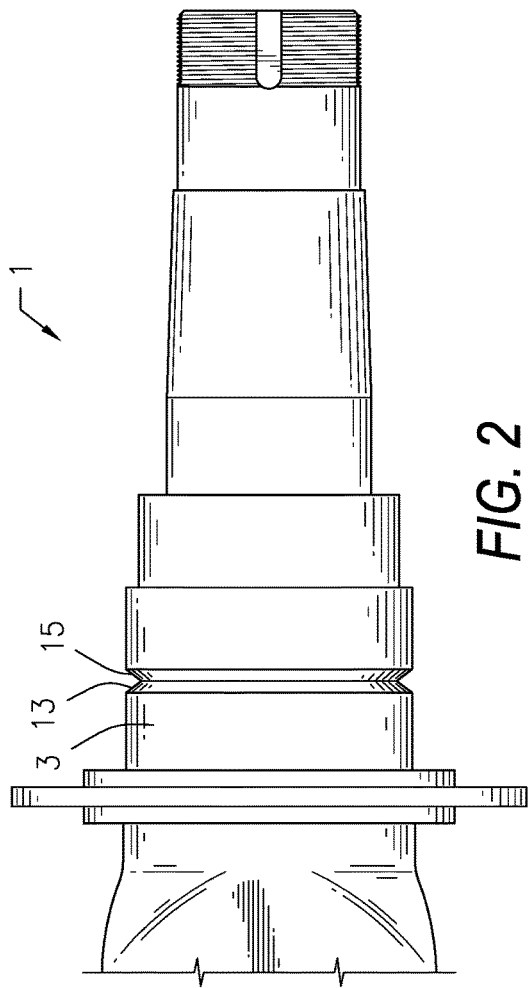

SERVICEABLE REPLACEMENT SPINDLE

BACKGROUND OF THE INVENTION

Cross Reference

Not Applicable.

Field of the Invention

This invention relates generally to a replacement spindle and more particularly, but not by way of limitation, to a replacement spindle that is serviceable and a method of installation and removal of the spindle.

DESCRIPTION OF THE RELATED ART

Truck and trailer spindles withstand significant wear during use and are often subject to failure. Such failures may be dangerous, as the first sign of spindle failure may be the loss of a wheel while the vehicle is in motion.

An original spindle may be integrally formed with or attached to the axle. When a spindle fails, however, rather than replacing the entire axle, just the damaged spindle may be removed and replaced by cutting the original spindle off the axle tube and attaching a replacement spindle. The typical method of replacement involves heating up the collar of the replacement spindle to make it expand, sliding it on the existing axle tube, and letting the collar cool and contract, thus securing the replacement spindle to the axle tube via thermal interference fit. The junctions are then welded, typically on either side of the collar.

The biggest drawback with regards to this method is that it is not reversible. The replacement spindle cannot be easily removed from the axle for service or replacement. Many spindle failures could be avoided through proper maintenance of the spindle, while timely replacement of damaged spindles may prevent accidents due to catastrophic failure of the spindles during use.

Based on the foregoing, it is desirable to provide a serviceable replacement spindle.

It is further desirable for the replacement spindle to be easily removable for service or replacement.

It is further desirable for the replacement spindle to be more securely attached to the axle than current replacement spindles.

It is further desirable for the replacement spindle to be easily attachable to the axle for on-site installation of the replacement spindle without the need for removing or otherwise dismantling the axle.

SUMMARY OF THE INVENTION

In general, in a first aspect, the invention relates to a spindle assembly for use with an axle tube, the spindle assembly comprising: a spindle body; an exteriorly threaded cylinder extending coaxially outward from the spindle body; and an interiorly threaded bushing capable of being secured within the axle tube, where the interiorly threaded bushing corresponds to the exteriorly threaded cylinder such that the spindle body is capable of being secured to the interiorly threaded bushing by screwing the exteriorly threaded cylinder into the interiorly threaded bushing.

The spindle body may have a threaded end, where the exteriorly threaded cylinder extends from the spindle body opposite the threaded end. The spindle body may comprise: the threaded end; a first bearing journal adjacent the threaded end; a spacer adjacent the first bearing journal; a second bearing journal adjacent the spacer; and a collar adjacent the second bearing journal, where the exteriorly threaded cylinder is adjacent the collar. The threaded end, the first bearing journal, the spacer, the second bearing journal, the collar, and the exteriorly threaded cylinder may be coaxial. The threaded end, the first bearing journal, the spacer, the second bearing journal, the collar, and the exteriorly threaded cylinder may have an axial bore therethrough.

The spindle assembly may further comprise a collar, where the exteriorly threaded cylinder is adjacent the collar. The collar may have a flange and the flange may have a diameter generally the same as the axle tube. The flange may have an outer edge with a bevel. The interiorly threaded bushing may likewise have an outer edge with a bevel.

In a second aspect, the invention relates to a spindle for use with an axle tube, the spindle comprising a spindle body with a threaded end and an exteriorly threaded cylinder extending coaxially outward from the spindle body opposite the threaded end. The spindle body may comprise: the threaded end; a first bearing journal adjacent the threaded end; a spacer adjacent the first bearing journal; a second bearing journal adjacent the spacer; and a collar adjacent the second bearing journal, where the exteriorly threaded cylinder is adjacent the collar. The threaded end, the first bearing journal, the spacer, the second bearing journal, the collar, and the exteriorly threaded cylinder may be coaxial and/or may have an axial bore therethrough. The spindle may further comprise a collar, where: the exteriorly threaded cylinder is adjacent the collar; the collar has a flange; the flange has a diameter generally the same as the axle tube; and the flange has an outer edge with a bevel.

In a third aspect, the invention relates to a method of replacing a spindle, the method comprising: cutting an existing spindle from an axle tube; sliding an interiorly threaded bushing inside the axle tube; and screwing a correspondingly threaded end of a spindle body into the bushing. The method may further comprise beveling an outer edge of the axle tube and welding the spindle body to the axle tube by applying a weld in a V-shaped space between the bevel on the outer edge of the axle tube and a corresponding bevel on the spindle body. The method may further comprise removing the spindle body from the axle tube by removing the weld and unscrewing the spindle body from the bushing.

The method may further comprise measuring an interior diameter of the axle tube and turning the bushing on a lathe to match the interior diameter of the axle tube such that the bushing fits snugly within the axle tube after being slid therein. The method may further comprise: placing a jig over the spindle body; securing the jig to the axle tube; tack welding the bushing to the inside of the axle tube; removing the jig and the spindle body; fully welding the jig to the axle tube; and rescrewing the threaded end of the spindle body into the bushing.

BRIEF DESCRIPTION OF THE DRAWINGS

FIG. 1 is an expanded side view of the replacement spindle of the present invention, including the threaded bushing and the axle tube;

FIG. 2 is a side view of the replacement spindle in place on the axle tube, prior to welding;

Figure 3:
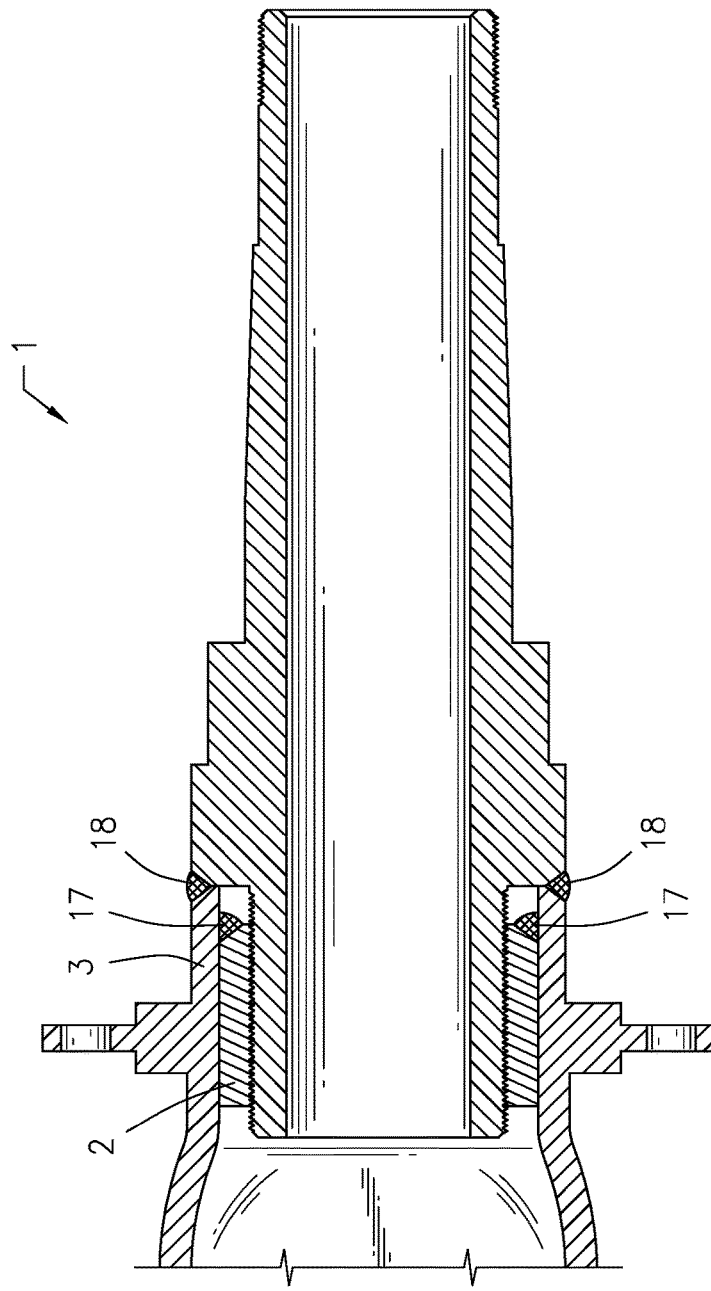
FIG. 3 is a cross-sectional side view of the replacement spindle in place on the axle tube.
Figure 4:
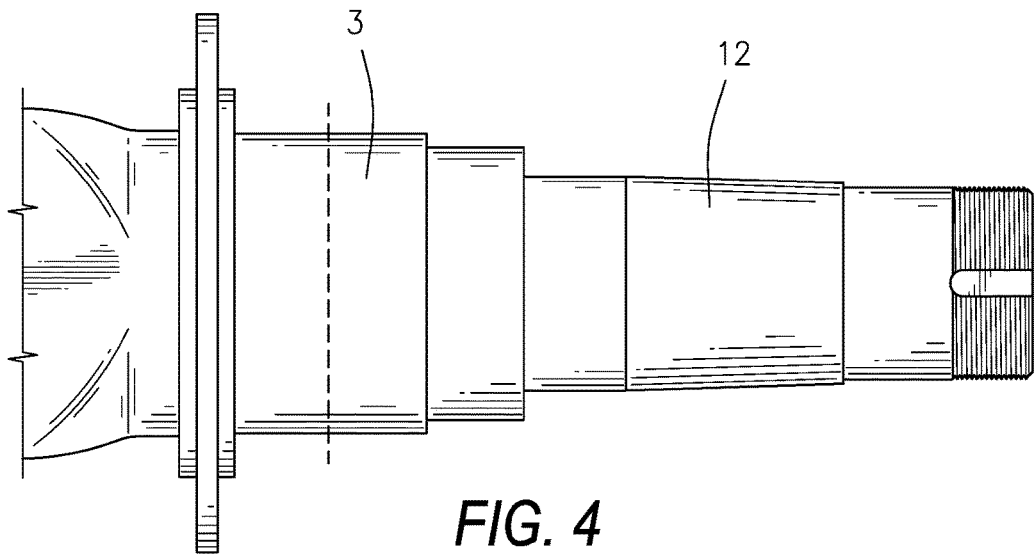
FIG. 4 is a side view of an original spindle in place on the axle tube.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a serviceable replacement spindle for use with a truck, trailer, or other vehicle, as well as a method of installing and removing the replacement spindle. The same replacement spindle and method may be used with any spindle, whether on a vehicle or on other equipment or machinery. The replacement spindle may be made of any desired material or combinations of material. In particular, the replacement spindle may be made of the same material as the original spindle and/or the axle tube.

As shown in the drawings, the serviceable replacement spindle may comprise a spindle body 1 and a threaded bushing 2. The replacement spindle may be used with an existing axle tube 3. The spindle body 1 may include typical elements of a spindle, such as a wear ring collar/spacer 4, bearing journals 5 and 6, a spacer 7, and a threaded end 8, which may have a keyway 9 for a locking device. These elements may have an axial bore therethrough or may have a solid center, as desired. The wear ring collar 4 may be separate from the rest of the spindle body 1 or may be integrally formed therewith, as shown.

Unlike a typical spindle, the spindle body 1 may have a threaded cylinder 10, as shown in FIG. 1. The threaded cylinder 10 may be coaxial with the remainder of the spindle body 1 and may be located opposite the threaded end 8. The threaded cylinder 10 may have an axial bore therethrough or may have a solid center, as with the rest of the spindle body 1. The threaded cylinder 10 may have a smaller diameter than the collar 4. If the collar 4 is integrally formed with the rest of the spindle body 1, the threaded cylinder 10 may project coaxially therefrom. If the collar 4 is separate, the threaded cylinder 10 may project coaxially from the bearing journal 5. The threaded cylinder 10 may be threaded on its exterior, as shown.

The threaded bushing 2 may be generally cylindrical and may specifically be tubular, with an axial bore therethrough. The threaded bushing 2 may be threaded on its interior with the threads matching those of the threaded cylinder 10, such that the threaded cylinder 10 may be threaded into the threaded bushing 2. The threaded bushing 2 may be capable of being turned down with a lathe to have a desired exterior diameter. The threaded bushing 2 may have a bevel 11 along the edge of one face, as shown.

Figure 5:
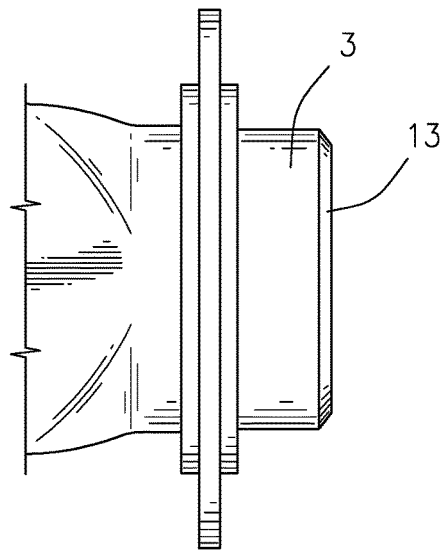
FIG. 5 is a side view of the axle tube with the original spindle removed.

The method of installing the replacement spindle is shown in FIGS. 4 through 8. First, the existing spindle 12 may be cut from the axle tube 3, such as along the dashed line shown in FIG. 4. Next, the axle tube 3 may be faced and a bevel 13 may be placed along the outer edge, as shown in FIG. 5. The wear ring collar 4 may have a flange 14 with a corresponding bevel 15. The flange 14 and the axle tube 3 may have the same diameter, such that when placed together, the bevels 13 and 15 may form a V-shape, as shown in FIG. 2.

Figure 6:
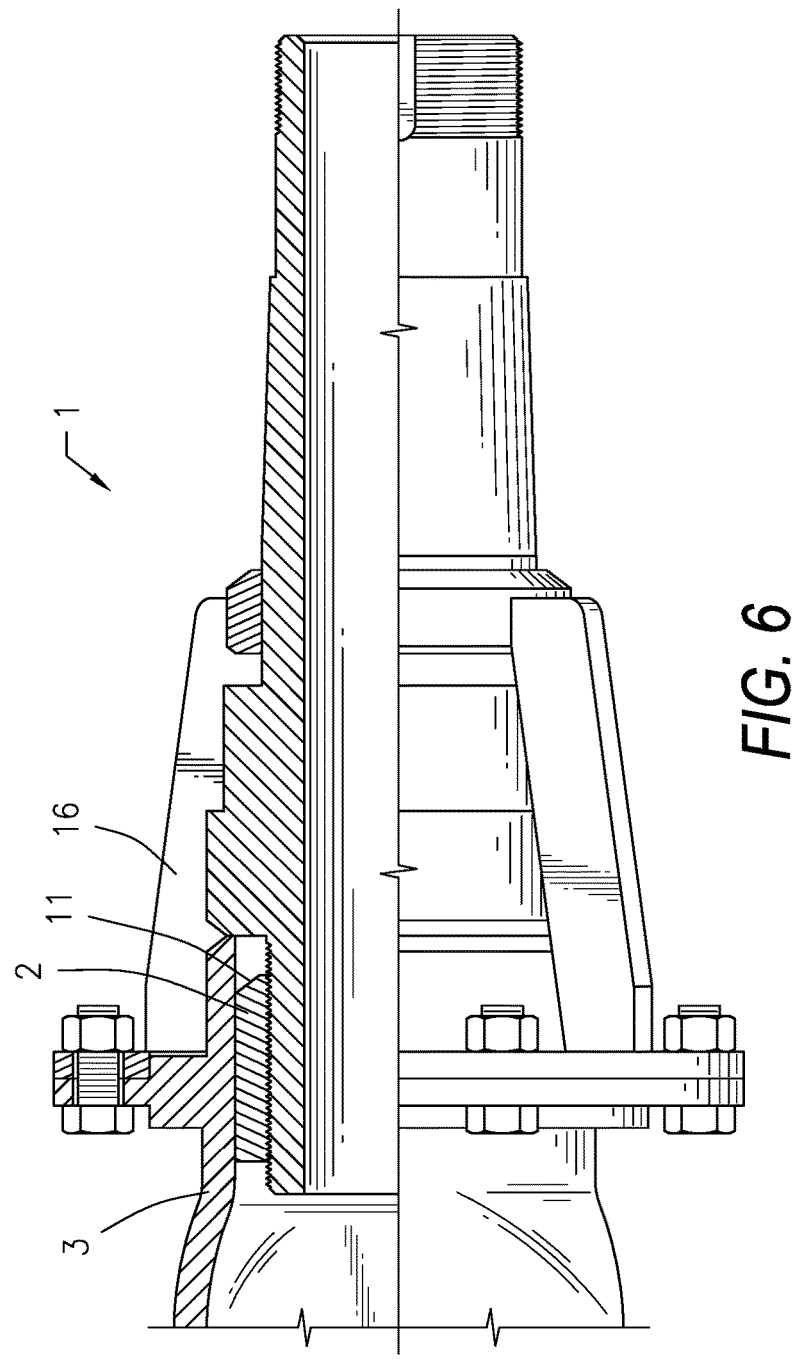
FIG. 6 is a partially cut away side view of the threaded bushing being installed within the axle tube, as described below.
Figure 7:
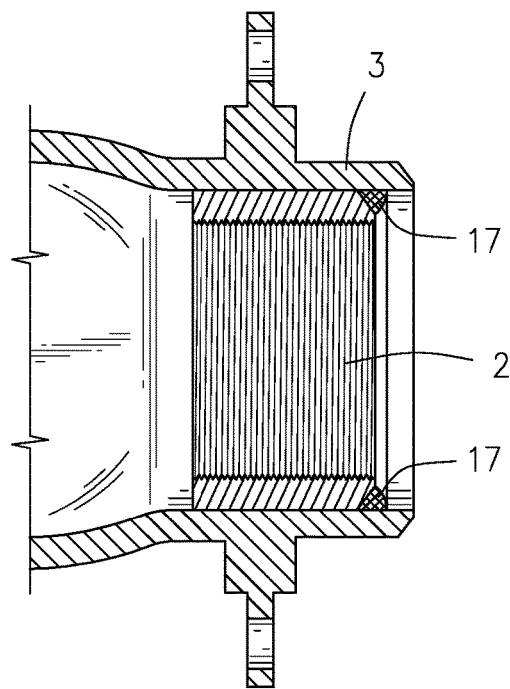
FIG. 7 is a cross-sectional side view of the axle tube with the threaded bushing in place therein.
Figure 8:
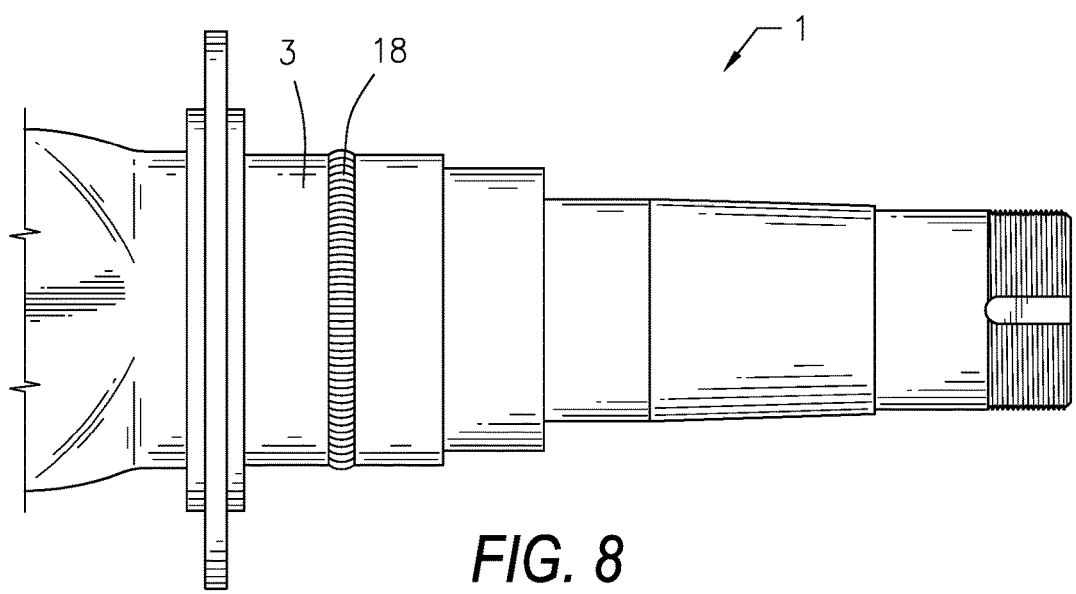
FIG. 8 is a side view of the replacement spindle in place on the axle tube, with the weld in place.

After beveling the axle tube 3, the next step may be measuring the interior diameter of the axle tube 3. The threaded bushing 2 may be placed on a lathe and turned down to the same diameter, such that the threaded bushing 2 may be snugly placed within the axle tube 3. The threaded bushing 2 may be inserted into the axle tube 3 with its bevel 11 facing toward the opening of the axle tube 3, as shown in FIG. 6. The threaded bushing 2 may be inserted fully into the axle tube 3, such that it is spaced from the opening thereto. The spindle body 1 may be screwed into the threaded bushing 2 and a jig 16 may be slid over the spindle body 1 and attached to the brake plate, as shown in FIG. 6. This may ensure that the threaded bushing 2 is properly centered within the axle tube 3. The threaded bushing 2 may be tack welded to the interior of the axle tube 3 through one of more holes in the jig 16. The jig 16 and the spindle body 1 may be removed, and the threaded bushing 2 may be fully welded within the axle tube 3 along the bevel 11. Weld 17 may be seen in FIG. 7. Once the threaded bushing 2 is secured in place within the axle tube 3, the spindle body 1 may be screwed into place, as shown in FIG. 2. Weld 18 may be applied in the V formed between bevels 13 and 15 to further secure the replacement spindle in place.

To remove the replacement spindle for service or replacement, the user may simply axle grind weld 18 off and unscrew the spindle body 1. A new spindle body 1 may be screwed into the existing threaded bushing 2 and a new weld 18 may be applied, thus greatly minimizing the time and effort required to replace the spindle.

Whereas, the devices and methods have been described in relation to the drawings and claims, it should be understood that other and further modifications, apart from those shown or suggested herein, may be made within the spirit and scope of this invention.

What is claimed is:

1. A spindle assembly for use with an axle tube, the spindle assembly comprising:
    a spindle body;
    an exteriorly threaded cylinder extending coaxially outward from the spindle body; and
    an interiorly threaded bushing capable of being secured within the axle tube, where the interiorly threaded bushing corresponds to the exteriorly threaded cylinder such that the spindle body is capable of being secured to the interiorly threaded bushing by screwing the exteriorly threaded cylinder into the interiorly threaded bushing.

2. The spindle assembly of claim 1 where the spindle body has a threaded end, where the exteriorly threaded cylinder extends from the spindle body opposite the threaded end.

3. The spindle assembly of claim 2 where the spindle body comprises:
    a first bearing journal adjacent the threaded end;
    a spacer adjacent the first bearing journal;

a second bearing journal adjacent the spacer; and a collar adjacent the second bearing journal, where the exteriorly threaded cylinder is adjacent the collar;

where the threaded end, the first bearing journal, the spacer, the second bearing journal, the collar, and the exteriorly threaded cylinder are coaxial.

4. The spindle assembly of claim 3 where the threaded end, the first bearing journal, the spacer, the second bearing journal, the collar, and the exteriorly threaded cylinder have an axial bore therethrough.

5. The spindle assembly of claim 1 further comprising a collar, where the exteriorly threaded cylinder is adjacent the collar.

6. The spindle assembly of claim 5 where the collar has a flange and where the flange has a diameter generally the same as a diameter of the axle tube.

7. The spindle assembly of claim 6 where the flange has an outer edge with a bevel.

8. The spindle assembly of claim 1 where the interiorly threaded bushing has an outer edge with a bevel.

9. A method of replacing a spindle, the method comprising:
   cutting an existing spindle from an axle tube;
   sliding an interiorly threaded bushing inside the axle tube; and
   screwing a correspondingly threaded end of a spindle body into the bushing.

10. The method of claim 9, the method further comprising:
   beveling an outer edge of the axle tube; and
   welding the spindle body to the axle tube by applying a weld in a V-shaped space formed between the bevel on the outer edge of the axle tube and a corresponding bevel on the spindle body.

11. The method of claim 10, the method further comprising removing the spindle body from the axle tube by removing the weld and unscrewing the spindle body from the bushing.

12. The method of claim 9, the method further comprising:
   measuring an interior diameter of the axle tube; and
   turning the bushing on a lathe to match the interior diameter of the axle tube such that the bushing fits within the axle tube after being slid therein;
where the measuring and turning steps are performed after cutting the existing spindle from the axle tube but before sliding the interiorly threaded bushing inside the axle tube.

13. The method of claim 9, the method further comprising:
   placing a jig over the spindle body;
   securing the jig to the axle tube;
   tack welding the bushing to the inside of the axle tube;
   removing the jig and the spindle body;
   fully welding the bushing to the axle tube; and
   rescrewing the threaded end of the spindle body into the bushing.

\* \* \* \* \*